(No Model.) 3 Sheets—Sheet 1.
T. WHITAKER & S. D. MOORE.
CHECK ROWER.
No. 273,789. Patented Mar. 13, 1883.
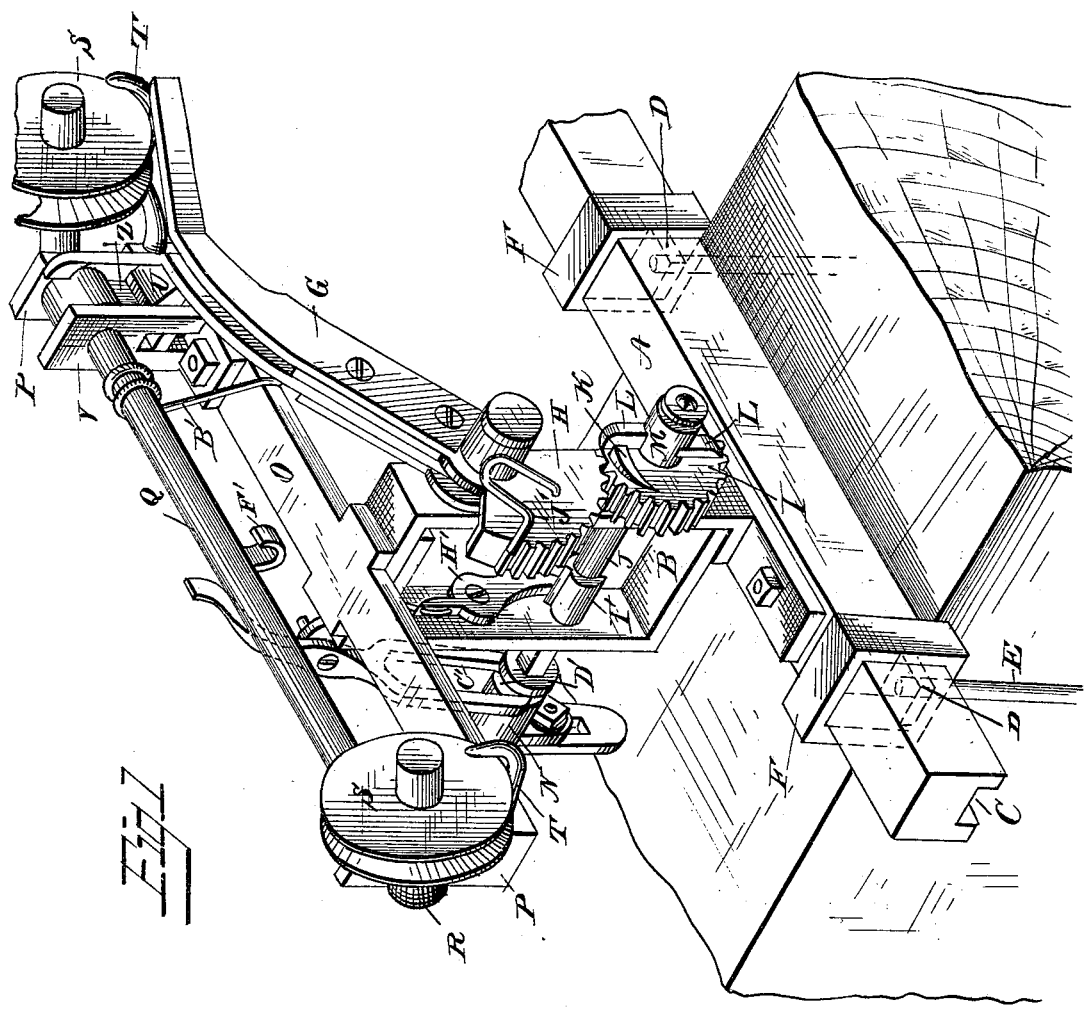
WITNESSES
INVENTORS (No Model.) 3 Sheets—Sheet 2.
T. WHITAKER & S. D. MOORE.
CHECK ROWER.
No. 273,789. Patented Mar. 13, 1883.
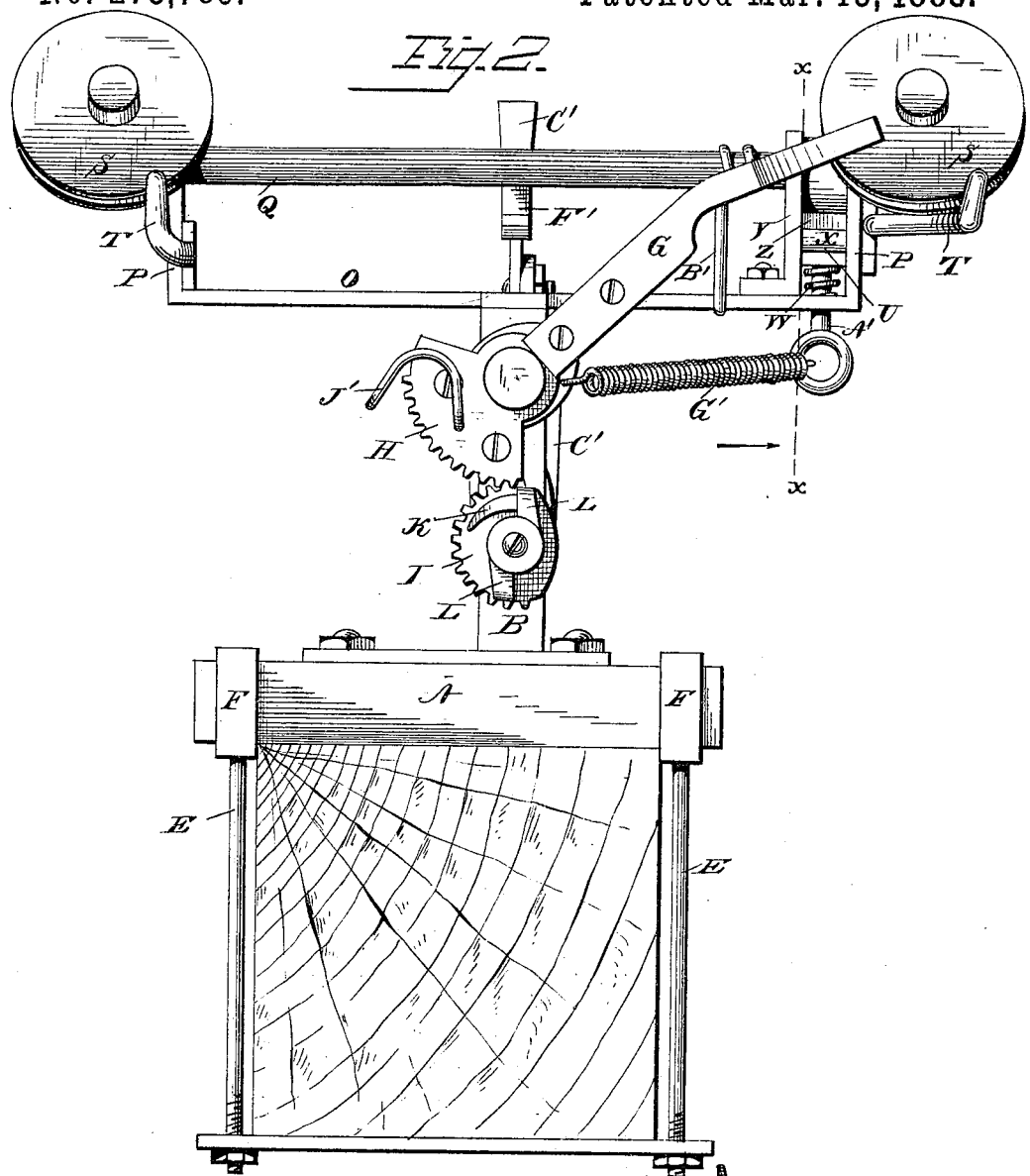
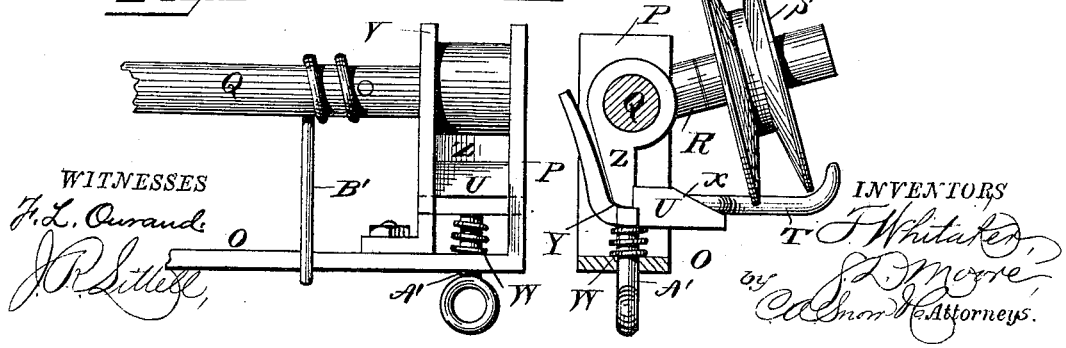
WITNESSES
INVENTORS (No Model.) 3 Sheets—Sheet 3.
T. WHITAKER & S. D. MOORE.
CHECK ROWER.
No. 273,789. Patented Mar. 13, 1883.
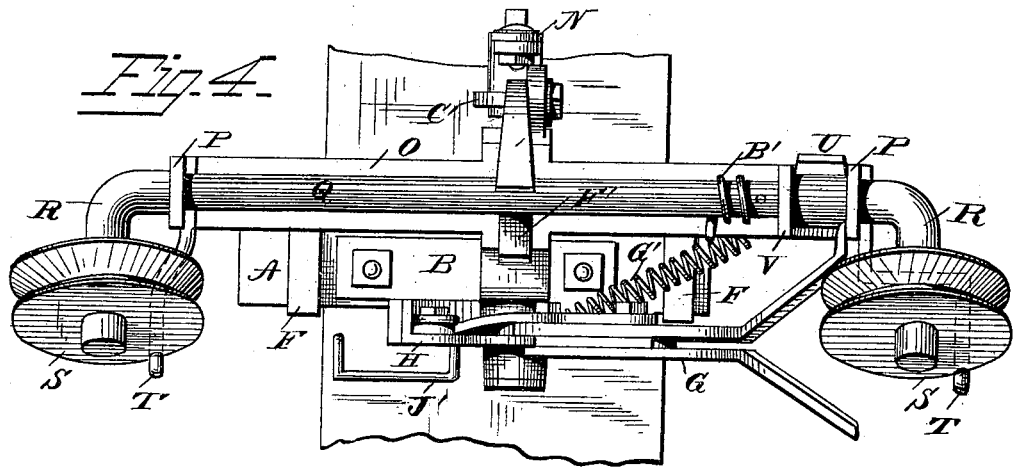
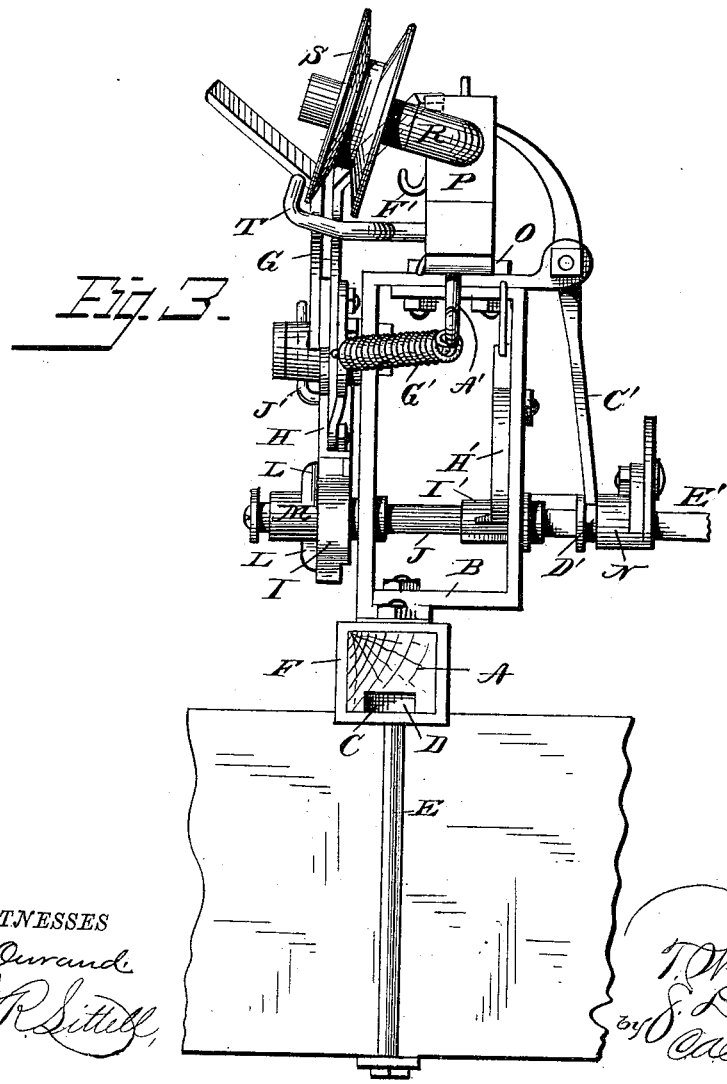

UNITED STATES PATENT OFFICE.

THOMAS WHITAKER AND SILAS D. MOORE, OF MACON, ILLINOIS.

CHECK-ROWER.

SPECIFICATION forming part of Letters Patent No. 273,789, dated March 13, 1883.

Application filed July 15, 1882. (No model.)

*To all whom it may concern:*

Be it known that we, THOMAS WHITAKER and SILAS D. MOORE, of Macon, in the county of Macon and State of Illinois, have invented certain new and useful Improvements in Check-Rowers; and we do hereby declare that the following is a full, clear, and exact description of the invention, which will enable others skilled in the art to which it appertains to make and use the same, reference being had to the accompanying drawings, which form a part of this specification.

Figure 1 is a perspective view of our improved check-row attachment to corn-planters. Fig. 2 is a side view. Fig. 3 is an end view. Fig. 4 is a top view. Fig. 5 is a sectional view on the line $x\,x$, Fig. 2; and Fig. 6 is a detail view.

Corresponding parts in the several figures are denoted by like letters of reference.

This invention relates to check-row attachments for corn-planters; and it consists in certain improvements in the construction of the same, which will be hereinafter fully described, and particularly pointed out in the claims.

In the drawings hereto annexed, A represents a wooden beam or bar, upon which the frame B of our improved check-row attachment is mounted, as shown. The bar A has a longitudinal groove, C, in its under side, to receive the heads D of bolts E, which bolts pass through the lower sides of frames F, that encircle the beam A, and serve to attach it to the box or frame of the planter.

Pivoted to the side of frame B is a forked lever, G, carrying at its lower end a cogged or toothed segment, H. The latter meshes with another toothed segment, I, mounted loosely upon a shaft, J, journaled transversely in frame B. The face of segment I is provided with a dog or ratchet, K, capable of engaging the arms L L of a sleeve, M, sliding upon the end of shaft J, which is squared, so as to revolve with said sleeve. A suitable spring may be arranged to hold the sleeve in contact with the segment I, the arms L of which will thus be readily engaged by the beveled dog or ratchet K. The inner end of shaft J is to be connected by a suitable coupling, N, with the seeding mechanism of the planter, which, however, is not shown in the drawings.

Upon the upper side of the frame B is secured a longitudinal bar, O, the ends of which have upward-projecting brackets P, in which a shaft, Q, is journaled. The ends of shaft Q are provided with arms R, carrying the grooved guide-pulleys S for the tappet-wire, which is held up to said pulleys by rests or supports T, projecting outwardly from the bar O.

U is a box sliding vertically between one of the brackets P and another bracket, V, projecting upwardly from bar O, and forced automatically in an upward direction by a spring, W. The box U has a beveled front side, X, and a notch, Y, to receive an arm, Z, extending from the shaft Q, thus serving to lock the latter in position. The box U is mounted upon a stem, A', extending down through the bar O, and forming a handle, by which the box U may be pulled downward, so as to be disengaged from arm Z, thus permitting the shaft Q to turn in its bearings. When the arm Z engages the notch Y in box U the grooved guide-pulleys are thrown outward over the supporting-brackets T, thus preventing the displacement of the tappet-wire during operation. When the end of the field is reached, and it is desired to change the tappet-wire, the shaft Q is turned as described, thus throwing the pulleys S back and releasing the tappet-wire. Shaft Q has a spring, B', bearing against the bar O, and serving to start the shaft Q when released. Said spring also forms a handle, by means of which the said shaft Q may be turned.

Pivoted to the inner side of frame B is a forked lever, C', the lower forked end of which engages an annular groove, D', in the coupling-sleeve N, to which reference has been made, and which connects the shaft J with the shaft E' of the seeding mechanism. (Not shown.) Shaft Q has an arm, F', adapted to strike the upper end of lever C', thereby operating the latter and throwing the coupling-sleeve N back upon shaft J, thus disengaging the latter from the seeding mechanism. It will be seen that this disengagement takes place, whenever the tappet-wire is released, by turning the shaft Q, in order to be changed to the other end of the planter.

G' is a spring connecting the stem A' of box U with the forked lever G, and serving to force or draw the latter automatically in a forward direction.

H' is a spring-pawl pivoted to frame B, and engaging a ratchet, I', upon the shaft J in order to prevent back motion of the latter.

J' is a spring secured to the cog-segment H, and adapted to bear upon the arms L for the purpose of assisting in forcing these forward to be engaged by the dog or ratchet K.

The operation of our invention will be readily understood from the foregoing description, taken in connection with the drawings hereto annexed. As the machine passes over the field the knots or tappets of the rope or wire engage the forked lever G, throwing the latter in a rearward direction. The segment H, engaging segment I, turns the latter, which, through the intermediate mechanism, consisting of the dog K and sleeve M, having arms L, serves to turn the shaft J in a forward direction, thus operating the seeding mechanism. When the knot or tappet slips out of the forked lever the latter is automatically returned by the spring G' to its original position, where it is ready for a repetition of the operation.

Having thus described our invention, we claim and desire to secure by Letters Patent of the United States—

1. The combination, with a corn-planter, of a check-row attachment mounted upon a longitudinal bar, frames inclosing and clamping said bar, and fastening bolts inserted through said clamping-frames, their heads being accommodated in a longitudinal groove in the under side of said bar, as set forth.

2. In a check-row attachment for corn-planters, the combination of the frame B, forked lever G, having toothed segment H, shaft J, having loose toothed segment I, provided with the dog or ratchet K, and sleeve M, having arms L L, substantially as set forth.

3. The combination of the forked lever G, having toothed segment H, the shaft J, loose toothed segment I, having ratchet K, sleeve M, having arms L, and the spring J', secured to segment H, substantially as set forth.

4. In a check-row attachment for corn-planters, the combination, with a frame having supporting-brackets for the tappet-wire, of a rock-shaft mounted in suitable bearings in said frame, and having arms carrying the grooved guide-pulleys for the tappet-wire, substantially as set forth.

5. The combination of the bar O, having brackets P, shaft Q, having arms R, carrying pulleys S, and arm Z, vertically sliding box U, having beveled front side, X, and notch Y, and a suitable spring arranged under box U, as set forth.

6. The combination of the shaft Q, having arms carrying the guide-pulleys, and provided with a spring, B', forming a handle for said shaft, with locking mechanism for retaining the shaft Q in position, substantially as set forth.

7. The combination of the shaft Q, having arm Z, box U, having beveled front X, notch Y, and spring W, as and for the purpose set forth.

8. The combination, with the shaft Q, carrying pulleys S, and having the arm F', of the shaft J, intermediate mechanism for operating the same, the shaft E', coupling-sleeve N, having groove D', and the forked lever C', as and for the purpose set forth.

In testimony that we claim the foregoing as our own we have hereto affixed our signatures in presence of two witnesses.

THOMAS WHITAKER.
SILAS D. MOORE.

Witnesses:
ANTON BESCHLE,
C. C. ATCHISON.